United States Patent [19]

Egger et al.

[11] Patent Number: 5,606,310
[45] Date of Patent: Feb. 25, 1997

[54] SAFETY BRAKING CONTROL FOR A VEHICLE THAT IS RESPONSIVE TO HARD BRAKING BY A DRIVER OF THE VEHICLE

[76] Inventors: Christopher M. Egger; Lori D. Egger, both of 2221 Maple Rose Dr., Las Vegas, Nev. 89134

[21] Appl. No.: 533,696

[22] Filed: Sep. 26, 1995

[51] Int. Cl.⁶ ........................................... B60Q 1/44
[52] U.S. Cl. .................... 340/479; 340/463; 340/467; 340/468
[58] Field of Search .................... 340/463, 464, 340/467, 468, 479, 439, 433; 307/10.8

[56] References Cited

U.S. PATENT DOCUMENTS

| | | | |
|---|---|---|---|
| 3,708,782 | 1/1973 | Mori | 340/479 |
| 3,710,315 | 1/1973 | Scherenberg | 340/466 |
| 3,846,749 | 11/1974 | Curry | 340/479 |
| 4,083,032 | 4/1978 | Nakamura et al. | 340/453 |
| 4,231,013 | 10/1980 | Freeman et al. | 340/479 |
| 4,878,042 | 10/1989 | Eggiman et al. | 340/439 |
| 5,150,098 | 9/1992 | Rakow | 340/464 |
| 5,207,095 | 5/1993 | Teare et al. | 73/121 |
| 5,504,472 | 4/1996 | Wilson | 340/479 |

*Primary Examiner*—Jeffery Hofsass
*Assistant Examiner*—Van T. Trieu

[57] ABSTRACT

A safety braking control for use with a vehicle for providing a visual warning of hard braking to a rearwardly positioned driver of another vehicle, the safety braking control includes an electrical hydraulic pressure transducer forming an analog electrical signal between the hydraulic braking system of the vehicle and a brake light control mechanism providing a significant electrical signal when hydraulic braking pressure is low and a lesser electrical signal when the hydraulic braking pressure is high; a brake light control mechanism in the electrical circuit between the vehicle foot pedal brake switch and vehicle brake lights, the brake light control mechanism having a normal braking mode of operation for allowing the vehicle brake lights to be constantly illuminated upon receipt of a higher electric signal from the transducer and a hard braking mode of operation for allowing the vehicle brake lights to be rapidly flashed upon receipt of a determined lesser electrical signal from the transducer.

1 Claim, 3 Drawing Sheets

SAFETY BRAKING CONTROL FOR A VEHICLE THAT IS RESPONSIVE TO HARD BRAKING BY A DRIVER OF THE VEHICLE

BACKGROUND OF THE INVENTION

1. Field of the Invention

The present invention relates to a safety braking control for a vehicle that is responsive to hard braking by a driver of the vehicle and more particularly pertains to providing a visual warning of sudden vehicular braking to a rearwardly positioned driver with a safety braking control that is responsive to hard braking by a driver.

2. Description of the Prior Art

The use of sudden deceleration warning systems for a vehicle is known in the prior art. More specifically, sudden deceleration warning systems for a vehicle heretofore devised and utilized for the purpose of providing a warning to a rearwardly positioned driver of sudden decelerations of such vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,148,147 to Kobres discloses a vehicle deceleration measurement system. U.S. Pat. No. 4,083,032 to Nakamura et al. discloses a speed-deceleration warning system for motor vehicles. U.S. Pat. No. 5,164,701 to Nan-Mu et al. discloses a car-operation-condition indicating apparatus. U.S. Pat. No. 5,172,095 to Scott discloses a vehicle deceleration alert system. U.S. Pat. No. 5,298,882 to Tsai discloses an LED display collision warning circuit for vehicles. U.S. Pat. No. 5,309,141 to Mason et al. discloses an emergency deceleration warning device.

While these devices fulfill their respective, particular objective and requirements, the aforementioned patents do not describe a safety braking control for a vehicle that is responsive to hard braking by a driver of the vehicle that is simple in design and allows a set of brake lights of the vehicle to be rapidly flashed at a selected rate when hard braking pressure is applied through depression of the vehicle brake pedal or brake mechanism.

In this respect, the safety braking control for a vehicle that is responsive to hard braking by a driver of the vehicle according to the present invention substantially departs from the conventional concepts and designs of the prior art, and in doing so provides an apparatus primarily developed for the purpose of providing a visual warning of such hard braking to a rearwardly positioned driver in another vehicle.

Therefore, it can be appreciated that there exists a continuing need for new and improved safety braking control for a vehicle that is responsive to hard braking by a driver of the vehicle which can be used for providing a visual warning of such hard braking to a rearwardly positioned driver in another vehicle. In this regard, the present invention substantially fulfills this need.

SUMMARY OF THE INVENTION

In the view of the foregoing disadvantages inherent in the known types of sudden deceleration warning systems for a vehicle now present in the prior art, the present invention provides an improved safety braking control for a vehicle that is responsive to hard braking by a driver of the vehicle. As such, the general purpose of the present invention, which will be described subsequently in greater detail, is to provide a new and improved safety braking control for a vehicle that is responsive to hard braking by a driver of the vehicle and method which has all the advantages of the prior art and none of the disadvantages.

To attain this, the present invention essentially comprises, in combination, an electrical hydraulic pressure transducer and a brake light control mechanism. The electrical pressure transducer is connected to and forms an analog electrical signal between the hydraulic braking system of the vehicle and the brake light control mechanism. The hydraulic pressure transducer has an output for transmitting a lower electrical signal when hydraulic braking pressure within the hydraulic line is raised as the driver applies harder pressure to the vehicle brake pedal of the hydraulic braking system. The hydraulic pressure transducer further transmits a higher electrical signal through the output when the hydraulic pressure within the hydraulic line is lower as the driver applies a normal pressure to the brake pedal.

The brake light control mechanism includes a single pole double throw mode electrical relay. The mode electrical relay included has a coil, a common switching terminal, a normally closed switch contact, and a normally open switch contact. The coil of the mode relay has a positive terminal being connected to vehicle electrical power coming from the vehicle brake switch and a negative terminal connected to the emitter of the braking mode driver transistor. The switching contacts of the mode relay have a common terminal connected to the vehicle power coming from the vehicle brake switch. The normally closed contact of the mode relay is connected to the vehicle brake lights. The normally open contact of the mode relay is connected to the power input terminal of the brake light control mechanism's flasher circuit. The mode relay is controlled by a hydraulic pressure transducer that sends a higher signal in normal braking and a lesser signal in hard braking. The signal is created by a voltage divider network. The network is connected to the vehicle power coming from the vehicle brake switch through a resistor that is connected in series to a second voltage divider resistor that is connected to the pressure transducer that is connected to the vehicle chassis ground. The voltage signal is sampled between the two resistors by a connection to the positive input terminal Of a comparator. The negative input terminal of the comparator is connected to a fixed signal. The fixed signal is created by a voltage divider network of a resistor connected on one end to the vehicle power coming from the vehicle brake switch and is connected then in series to a second voltage divider resistor that is connected to an adjustment potentiometer that is connected to the vehicle chassis ground. The negative terminal of the comparator is connected between the two resistors of this voltage divider network. The output of the comparator is connected to the base of a driver transistor. The collector of the driver transistor is connected to vehicle chassis ground. The emitter of the transistor is connected to the negative terminal of the mode relay. The mode relay is in the normal braking mode when the positive comparator input signal from the hydraulic pressure transducer network divider is above the negative comparator fixed signal. In normal braking, the normally closed contacts of the mode relay pass electrical power from the vehicle brake switch to the vehicle brake lights in a normal, constant on manner. In hard braking, the normally closed contacts of the mode relay are opened turning off the brake lights and the normally open mode relay contacts are closed supplying electrical power to the flasher circuit.

A double pole double throw flasher relay is included and has a coil and two sets of switching contacts each having a common switching terminal, a normally closed switch contact, and a normally open switch contact. The coil of the flasher relay has a positive terminal being connected to the normally open contact of the mode relay and a negative terminal connected to the emitter of the braking flasher driver transistor. The first switching contacts of the flasher relay have a common terminal connected to the vehicle power coming from the vehicle brake switch. The normally open contact of the first flasher relay is connected to the vehicle brake lights. The second switching contacts of the flasher relay have a common terminal connected to the negative terminal of a flasher control comparator. The normally closed contact of the second flasher contacts is connected to the negative side of a charging resistor. The normally open contact of the second flasher contacts is connected to the positive side of a discharging resistor. The flasher relay is controlled by the charging and discharging of a timing capacitor that sends a voltage signal to the negative input of the flasher control comparator. The positive terminal of the timing capacitor is connected to the negative input of the flasher control comparator. The negative terminal of the timing capacitor is connected to vehicle chassis ground. The timing capacitor is charged through a resistor and the normally closed second contacts of the flasher relay. The resistor is connected on one end to the normally open contact of the mode relay and on the other to the normally closed second contact of the flasher relay. As the timing capacitor charges, the voltage signal on the negative terminal of the flasher comparator increases. This is compared to a fixed voltage signal on the positive terminal of the flasher comparator. The fixed signal is created by a voltage divider network of a resistor connected to the normally open contact of the mode relay that is connected in series to a second voltage divider resistor that is connected to the vehicle chassis ground. The positive terminal of the flasher comparator is connected between the two resistors of this voltage divider network. The output of the comparator is connected to the base of a driver transistor. The collector of the driver transistor is connected to vehicle chassis ground. The emitter of the transistor is connected to the negative terminal of the flasher relay. The flasher relay is in off mode when the negative flasher comparator input signal from the timing capacitor is below the positive comparator fixed signal. In the off mode, the normally open first contacts of the flasher relay prevent electrical power to be passed to the vehicle brake lights, causing them to be off. The flasher relay enters the on mode when the negative flasher comparator input signal from the timing capacitor exceeds the positive comparator fixed signal. In the on mode, the normally open first contacts of the flasher relay are closed, conducting electrical power from the vehicle brake switch to the vehicle brake lights. In the on mode, the normally closed second contacts of the flasher relay open and the normally open second contacts of the flasher relay close, creating a discharge circuit for the timing capacitor through a discharge resistor. The resistor has one terminal connected to the normally open second contact of the flasher relay and the other terminal connected to chassis ground. The on mode is continued until the charge of the charging capacitor is lowered to a level below the positive input of the flasher comparator.

In addition, a capacitor and resistor are added to the flasher relay coil circuit. The capacitor has a positive terminal connected to the normally open contact of the mode relay. The negative terminal of the capacitor is connected to the emitter of the flasher driver transistor. The resistor has one terminal connected to the normally open contact of the mode relay and the other terminal connected to the emitter of the flasher driver transistor. The capacitor and resistor provide a temporal delay during flasher switching operations permitting the set of brake lights of the vehicle to be flashed on and off at a specific rate.

Lastly, a capacitor and resistor are added to the mode relay coil circuit. The capacitor has a positive terminal being connected to vehicle electrical power coming from the vehicle brake switch. The negative terminal of the capacitor is connected to the emitter of the mode driver transistor. The resistor has one terminal connected to vehicle electrical power coming from the vehicle brake switch and the other terminal connected to the emitter of the mode driver transistor. The capacitor and resistor provide a minimum time on of the hard braking mode once activated.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved safety braking control for a vehicle that is responsive to hard braking by a driver of the vehicle which has all the advantages of the prior art sudden deceleration warning systems for a vehicle and none of the disadvantages.

It is another object of the present invention to provide a new and improved safety braking control for a vehicle that is responsive to hard braking by a driver of the vehicle which may be easily and efficiently manufactured and marketed.

It is a further object of the present invention to provide a new and improved safety braking control for a vehicle that is responsive to hard braking by a driver of the vehicle which is of durable and reliable construction.

An even further object of the present invention is to provide a new and improved safety braking control for a vehicle that is responsive to hard braking by a driver of the vehicle which is susceptible of a low cost of manufacture with regard to both materials and labor, and which accordingly is then susceptible of low prices of sale to the consuming public, thereby making such a safety braking control for a vehicle that is responsive to hard braking by a driver of the vehicle economically available to the buying public.

Still yet another object of the present invention is to provide a new and improved safety braking control for a vehicle that is responsive to hard braking by a driver of the vehicle which provides in the apparatuses and methods of the prior art some of the advantages thereof, while simultaneously overcoming some of the disadvantages normally associated therewith.

Even still another object of the present invention is to provide a new and improved safety braking control for a vehicle that is responsive to hard braking by a driver of the vehicle for providing a visual warning of such hard braking to a rearwardly positioned driver in another vehicle.

Lastly, it is an object of the present invention to provide a new and improved safety braking control for a vehicle that is responsive to hard braking by a driver of the vehicle comprising an electrical hydraulic pressure transducer connected between and forming an analog electrical signal between the hydraulic braking system of the vehicle and a brake light control mechanism, the transducer providing a significant electrical signal when hydraulic braking pressure is low during normal braking and a lesser electrical signal when the hydraulic braking pressure is high during hard braking by the driver: the brake light control mechanism in the electrical circuit between the vehicle foot pedal brake switch and vehicle brake lights, the brake light control mechanism having a normal braking mode of operation for allowing the vehicle brake lights to be constantly illuminated upon receipt of a higher electric signal from the transducer and a hard braking mode of operation for allowing the vehicle brake lights to be rapidly flashed upon receipt of the predetermined lesser electrical signal from the transducer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

With reference now to the drawings, the preferred embodiment of the new and improved safety braking control for a vehicle that is responsive to hard braking by a driver of the vehicle embodying the principles and concepts of the present invention and generally designated by the reference number 10 will be described.

The preferred embodiment of the present invention comprises a plurality of components. In their broadest context, such components include a hydraulic pressure transducer, relays, comparators, resistors, capacitors, and a potentiometer. Such components are individually configured and correlated with respect to each other to provide the intended function of providing a visual warning of hard braking of a vehicle to a rearwardly positioned driver of another vehicle to thereby prevent collisions.

Figure 2:
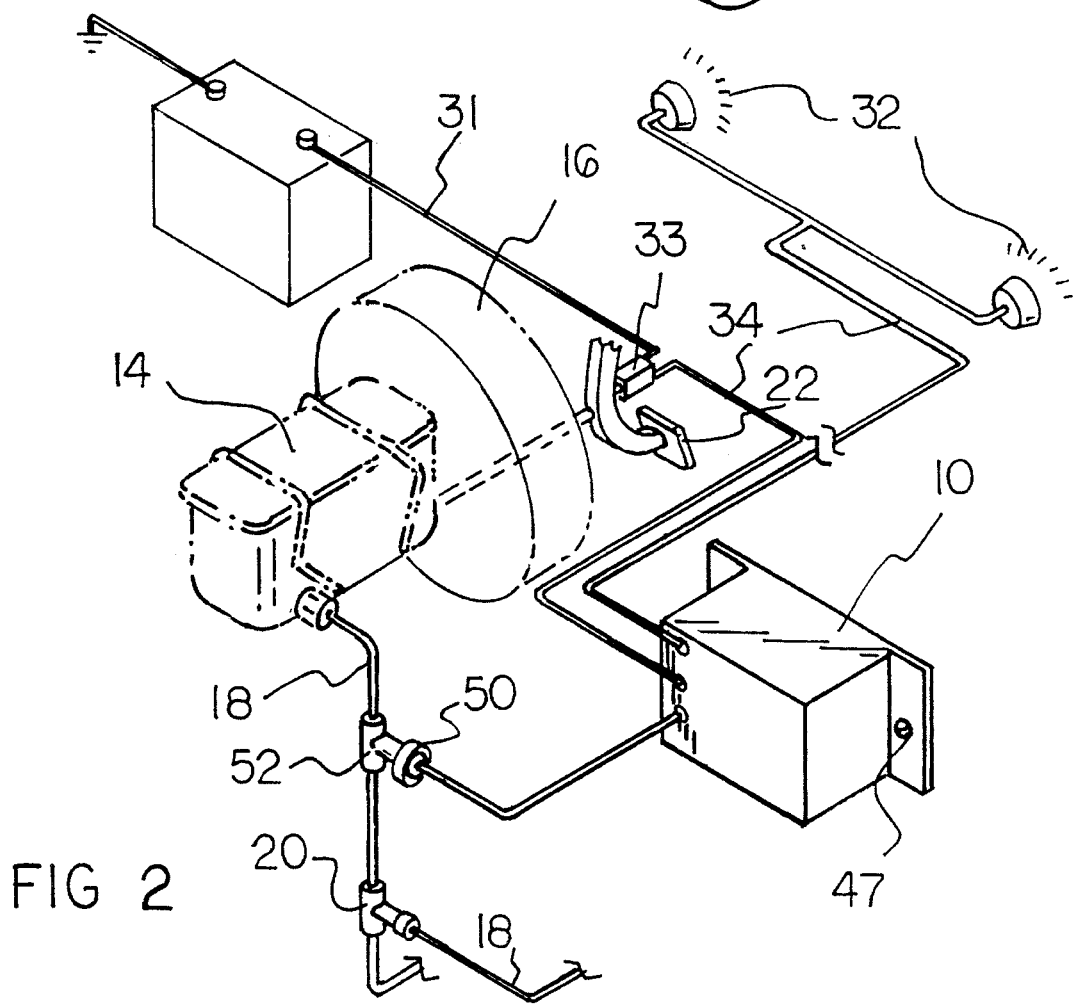
FIG. 2 is a perspective view of the interconnection of the present invention with an existing hydraulic braking system of a vehicle.

Specifically, the safety braking control mechanism 10 is adapted for use with a vehicle 12 such as a car or truck. The target vehicle to be utilized with the present invention has a hydraulic braking system 14 actuated by a master cylinder 16 through an interconnection of hydraulic lines 18 coupled together with a variety of associated fittings 20. Pressure is applied by a driver to the hydraulic braking system 14 through a brake pedal 22. In addition, the target vehicle also has an electrical braking indication system 30. The braking indication system is powered by a power source consisting of a 12-volt power battery or an alternator. The braking system includes a set of brake lights 32 that are coupled together with the power source through conducting wires 34, brake switch 33, and power lead 31. The present invention is readily installed in the vehicle by cutting the existing wire 34 to thereby provide an interconnection site as shown in FIGS. 2 and 5.

Figure 1:
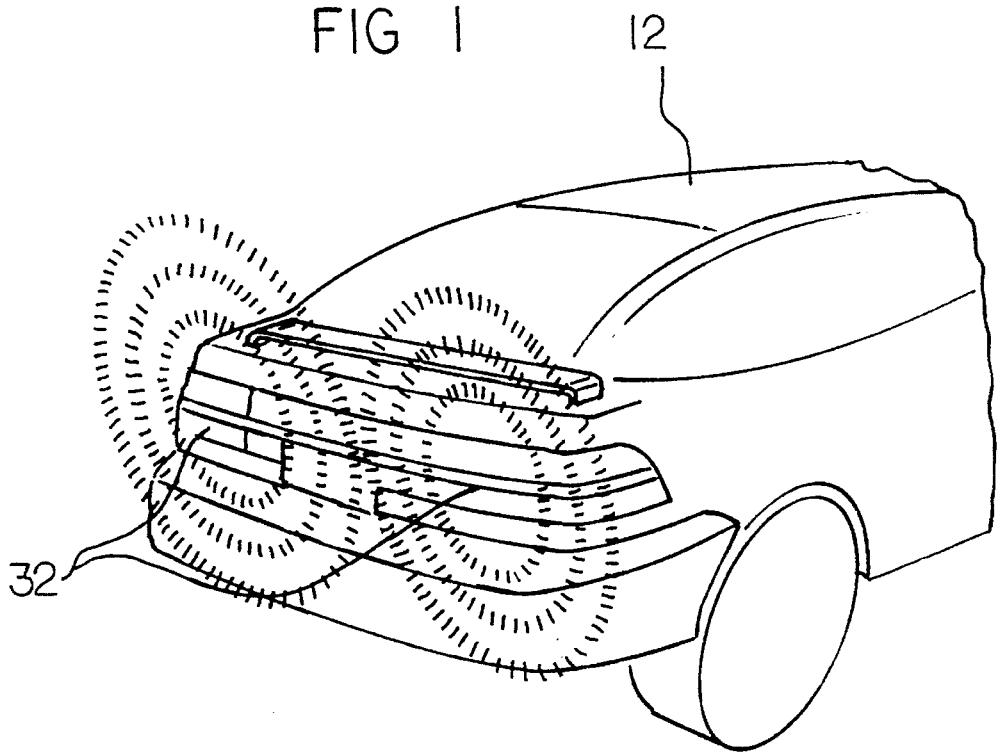
FIG. 1 is a perspective view of the preferred embodiment constructed in accordance with the principles of the present invention in operation on a rear extent of a vehicle for providing a visual warning of hard braking of such vehicle to a rearwardly positioned driver.
Figure 3:
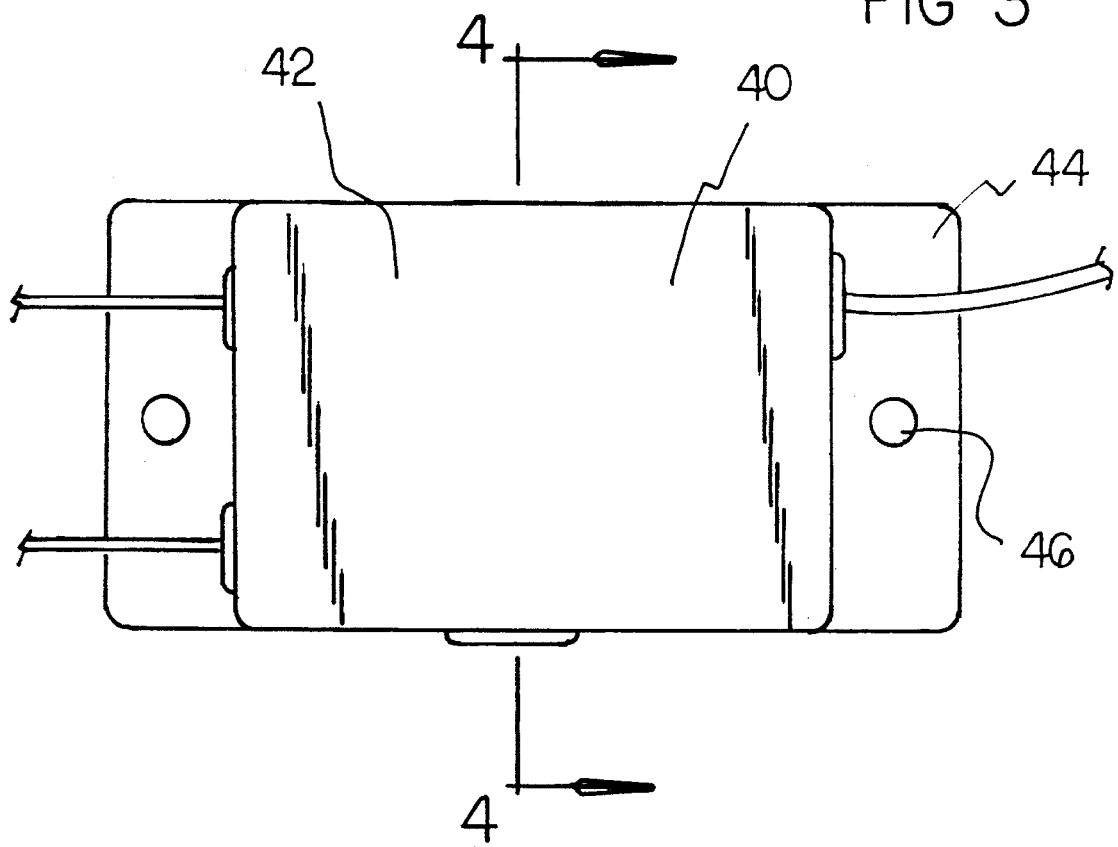
FIG. 3 is a plan view of the preferred embodiment of the present invention.

The present invention is responsive to hard braking pressure applied by a driver of the vehicle through brake pedal 22 to provide a visual warning of sudden vehicle braking to a rearwardly positioned driver in another vehicle as shown in FIG. 1. The present invention is encased in a hardened plastic housing 40 as shown in FIGS. 2 and 3 to preclude its direct exposure to adverse environmental conditions. The housing 40 includes a central, hollow, and box-shaped section 42 with a pair of opposed and outwardly extending flaps 44. Each flap has a through hole 46 formed thereon that is sized for receipt of a fastener 47 such as a bolt such as to allow a way to secure the present invention to a firewall or other rigid mounting structure within the vehicle.

Figure 5:
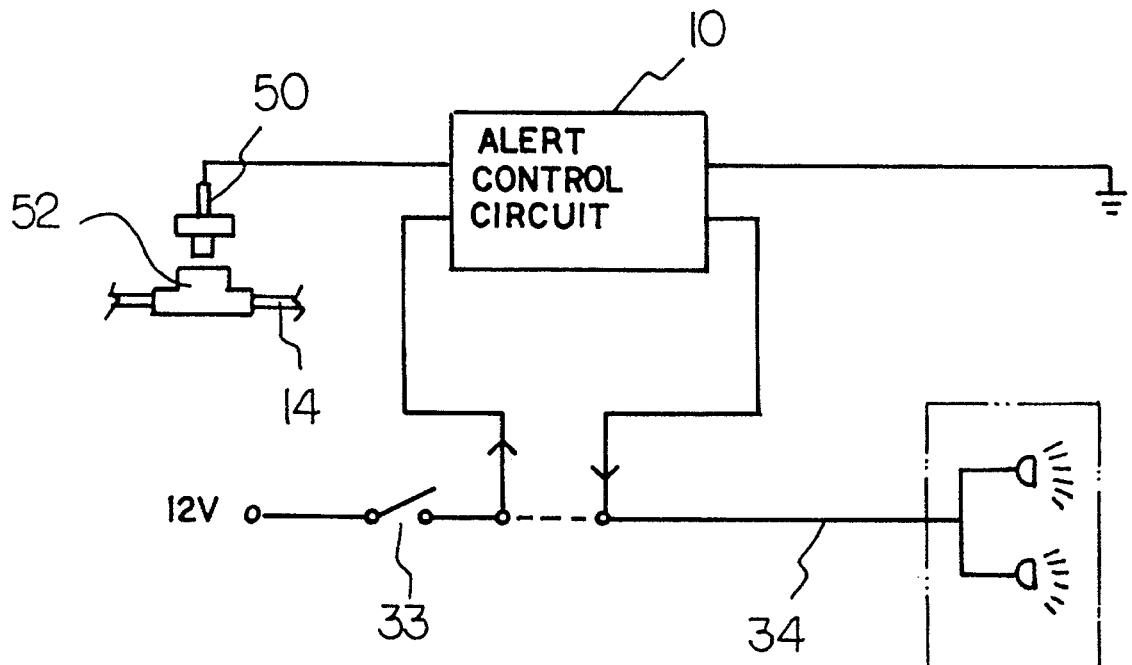
FIG. 5 is a schematic diagram depicting the interconnection of the present invention with a hydraulically driven brake system and electric braking circuit of a vehicle.

Specifically, the present invention includes an electrical hydraulic pressure transducer 50 as best illustrated in FIG. 5. Preferably, this hydraulic pressure transducer is formed of a conventional oil-pressure transducer. The hydraulic pressure transducer 50 forms an interconnection with the brake light control mechanism 10 as well as one of the hydraulic lines 18 of the hydraulic braking system. The hydraulic pressure transducer 50 is interconnected with the hydraulic braking system through use of a conventional T-shaped coupler 52. The hydraulic pressure transducer has an analog output for transmitting a lower electrical signal when hydraulic pressure within the hydraulic line 18 is raised above a normal level such as when the driver applies a sudden hard pressure to the brake pedal 22. The hydraulic pressure transducer further transmits a higher electrical signal through the output when the hydraulic pressure within the hydraulic line is within a normal level such as when the driver applies a normal pressure to the brake pedal. The level of normal pressure applied is significantly less than the high pressure applied by a driver such as during an emergency braking situation.

Figure 6:
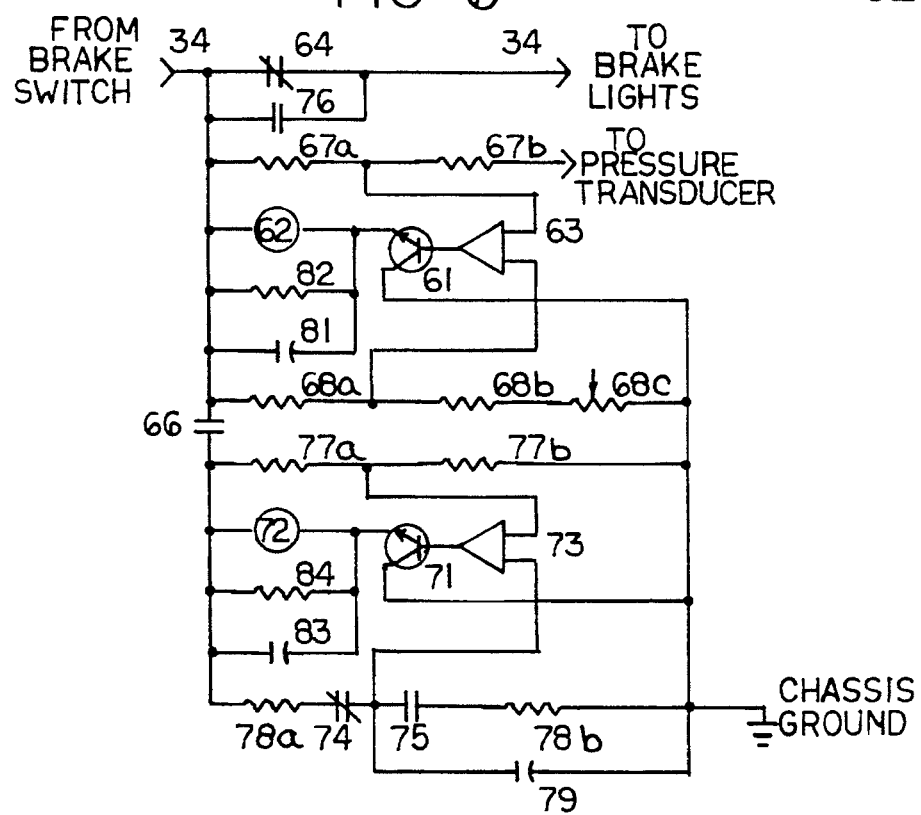
FIG. 6 is a schematic diagram of the electronic circuitry of the present invention.

In addition, the present invention includes a control circuit as shown in FIG. 6. The control circuit has a single pole double throw mode electrical relay 60. The mode electrical relay has a coil 62, a normally closed switch contact 64, and a normally open switch contact 66. The coil 62 of the mode relay has a positive terminal being connected to vehicle electrical power coming from the vehicle brake switch 33 on wire 34 and a negative terminal connected to the emitter of the braking mode driver transistor 61. The switching contacts of the 60 mode electrical relay has a common terminal connected to the vehicle power coming from the vehicle brake switch 33 on wire 34. The normally closed contact 64 of the mode relay is connected to the vehicle brake lights 32 on wire 34. The normally open contact 66 of the mode relay is connected to the power input terminal of the brake light control mechanism's flasher circuit. The mode relay 60 is controlled by a hydraulic pressure transducer 50 that sends a higher signal in normal braking and a lesser signal in hard braking. The signal is created by a series voltage divider network of vehicle power coming from the vehicle brake switch 33 that is connected to resistor 67a that is connected to resistor 67b that is connected to the pressure transducer 50 that is connected to the vehicle chassis ground. The voltage signal is sampled between the two resistors 67a and 67b by a connection to the positive input terminal of mode control comparator 63. The negative input terminal of the mode control comparator 63 is connected to a fixed signal. The fixed signal is created by a series voltage divider network of vehicle power coming from the vehicle brake switch 33 that is connected to resistor 68a that is connected to resistor 68b that is connected to an adjustment potentiometer 68c that is connected to the vehicle chassis ground. The negative terminal of the mode control comparator 63 is connected between resistors 68a and 68b of this voltage divider network. Potentiometer 68c calibrates the pressure trip point at which the mode control comparator 63 activates relay 62. The output of the mode control comparator 63 is connected to the base of a driver transistor 61. The collector of the driver transistor 61 is connected to vehicle chassis ground. The emitter of the driver transistor 61 is connected to the negative terminal of the mode relay coil 62. The mode relay 62 is in the normal braking mode when the positive input signal of mode control comparator 63 from the hydraulic pressure transducer network divider is above the negative mode control comparator fixed signal. In normal braking, the normally closed contacts 64 of the mode relay 60 pass electrical power from the vehicle brake switch 33 to the vehicle brake lights 32 in a normal, constant on manner. In hard braking, the normally closed contacts 64 of the mode relay 60 are opened, turning off the brake lights 32, and the normally open contacts 66 of the mode relay 60 are closed, supplying electrical power to the flasher relay 70.

The flasher circuit has a double pole double throw flasher relay 70. The flasher relay has a coil 72, two sets of normally open switching contacts 75 and 76, and a normally closed switch contact 74. The flasher relay coil 72 has a positive terminal being connected to the normally open contact 66 of the mode relay 60 and a negative terminal connected to the emitter of the braking flasher driver transistor 71. The first normally open contacts 76 of the flasher relay 70 has a common terminal connected to the vehicle power coming from the vehicle brake switch 33 through wire 34, and its switch contact connected to the vehicle brake lights 32 through wire 34. The second switching contacts 74 and 75 of the flasher relay 70 has a common terminal connected to the negative terminal of a flasher control comparator 73. The normally closed contact 74 is connected to the negative side of a charging resistor 78a. The normally open contact 75 is connected to the positive side of a discharging resistor 78b. The flasher relay 70 is controlled by the charging and discharging of a timing capacitor 79 that sends a voltage signal to the negative input of the flasher control comparator 73. The positive terminal of the timing capacitor 79 is connected to the negative input of the flasher control comparator 73. The negative terminal of the timing capacitor is connected to vehicle chassis ground. The timing capacitor 79 is charged through a resistor 78a and the normally closed contacts 74 of the flasher relay 70. The resistor 78a is connected on one end to the normally open contact 66 of the mode relay 60 and on the other to the normally closed contact 74 of the flasher relay 70. As the timing capacitor 79 charges, the voltage signal on the negative terminal of the flasher control comparator 73 increases. This is compared to a fixed voltage signal on the positive terminal of the flasher control comparator 73. The fixed signal is created by a series voltage divider network of vehicle power coming from the normally open contact 66 of the mode relay 60 that is connected to resistor 77a that is connected to resistor 77b that is connected to the vehicle chassis ground. The positive terminal of the flasher control comparator 73 is connected between the two resistors 77a and 77b of this voltage divider network. The output of the flasher control comparator 73 is connected to the base of flasher driver transistor 71. The collector of the driver transistor 71 is connected to vehicle chassis ground. The emitter of the transistor 71 is connected to the negative terminal 66 of the mode relay 60. The flasher relay 70 is in off mode when the flasher control comparator 73 negative input signal from the timing capacitor 79 is below the flasher control comparator 73 positive fixed signal. In the off mode, the normally open contacts 76 of the flasher electrical relay prevent electrical power to be passed from the brake switch 33 to the vehicle brake lights 32, causing them to be off. The flasher relay 70 enters the on mode when the flasher control comparator 73 negative input signal from the timing capacitor 79 exceeds the flasher control comparator 73 positive input signal. In the on mode, the normally open contact 76 of the flasher relay 70 are closed, conducting electrical power from the vehicle brake switch 33 to the vehicle brake lights 32. In the on rode, the normally closed contacts 74 of the flasher relay 70 open and the normally open contacts 75 of the flasher relay 70 close, creating a discharge circuit for the timing capacitor 79 through a discharge resistor 78b. The resistor 78b has one terminal connected to the normally open contact 75 of the flasher relay 70 and the other terminal connected to chassis ground. The on mode is continued until the charge of the charging capacitor 79 is lowered to a level below the positive input of the flasher control comparator 73.

In addition, a first timing circuit formed of a capacitor 83 and resistor 84 are added to the flasher relay coil 72. The capacitor 83 has a positive terminal connected to the normally open contact 66 of the mode relay 60. The negative terminal of the capacitor 83 is connected to the emitter of the flasher driver transistor 71. The resistor 84 has one terminal connected to the normally open contact 66 of the mode relay 60 and the other terminal connected to the emitter of the flasher driver transistor 71. The capacitor 83 and resistor 84 provide a temporal delay during flasher switching operations permitting the brake lights of the vehicle to be flashed on and off at a specific rate. A potentiometer could also be incorporated into this timing circuit to allow the specific flashing rate to be adjusted.

Lastly, a second timing circuit formed of a capacitor 81 and resistor 82 are added to the mode relay coil 62. The capacitor 81 has a positive terminal being connected to vehicle electrical power load 44 coming from the vehicle brake switch 33. The negative terminal of the capacitor 81 is connected to the emitter of the mode driver transistor 61. The resistor 82 has one terminal connected to vehicle electrical power lead 43 coming from the vehicle brake switch 33 and the other terminal connected to the emitter of the mode driver transistor 61. The capacitor 81 and resistor 82 provide a minimum time on of the hard braking mode once activated. A potentiometer could also be incorporated into this timing circuit to allow the minimum time on in the hard braking mode to be adjusted.

In summary, the present invention is connected to the electrical brake circuit and hydraulic brake circuit of a vehicle. An oil-pressure transducer is used in conjunction with the hydraulic brake system to sense high pressure conditions indicative of hard braking. When normal braking pressure occurs, the brake lights work in a normal manner via the normally-closed switching contacts of the mode relay. When a higher brake pressure occurs such as in hard braking, the oil pressure transducer allows enough current to flow to cause the mode control comparator of the mode circuit to energize. The oil-pressure transducer thus detects an increase in hydraulic pressure and thereby provides a decrease in the rate of resistance. This in turn disables the normal brake light circuit and activates the flasher circuit. The flasher circuit thereby causes the brake lights to flash. Once high pressure is removed from the hydraulic pressure transducer, the brake lights return to operating in their normal manner. In an alternate embodiment of the present invention, the hydraulic pressure transducer could be replaced with an air pressure transducer, thereby allowing the safety braking control 10 to be used on trucks and buses that use pneumatic brakes. The air pressure transducer would operate similarly to the hydraulic transducer as previously described.

Figure 4:
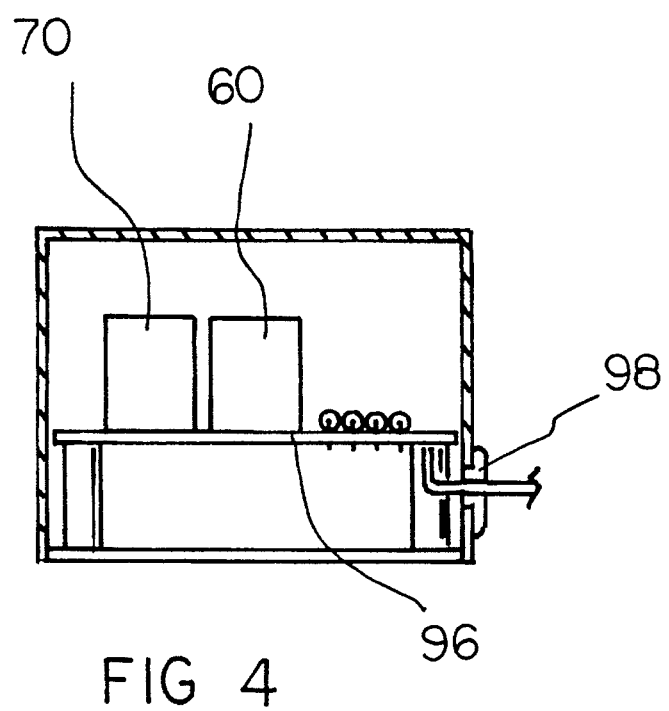
FIG. 4 is a cross-sectional view of the present invention taken along the line 4—4 of FIG. 3.

The type of items used in constructing the present invention include conventional electronic wire and components, a brass "T" fitting that is coupleable to the hydraulic brake line of a vehicle, and an oil-pressure transducer for providing the actuating electrical signal. The present invention provides a needed safety aspect to driving. Furthermore, it is relatively inexpensive and can be used on existing vehicles. It can be readily installed. All electronic components are mounted on a printed wire board 96 that is contained within the housing 40 as shown in FIG. 4. Grommets 98 are used to environmentally seal holes through which electrical braking system wire 34 and pressure sensor wires 100 enter the housing 40.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A safety braking control for use with a vehicle, the vehicle having a hydraulic braking system actuateable through a brake pedal and at least one tapable hydraulic brake line, the vehicle further having an electrical braking indication system actuateable through a brake pedal switch that is in operative association with the brake pedal and a set of brake lights that is energized via an electrical power source and controlled through the brake switch, the safety braking control being responsive to hard braking pressure applied by a driver of the vehicle for providing a rapidly flashing visual warning of hard braking to a rearwardly positioned driver of another vehicle, the safety braking control comprising, in combination:

an electrical pressure transducer coupleable to the hydraulic brake line of the hydraulic braking system of the vehicle, the hydraulic pressure transducer having an output for transmitting a lower electrical signal when hydraulic braking pressure within the hydraulic line is raised above a normal level as the driver applies an above normal pressure to the brake pedal of the vehicle, the hydraulic pressure transducer further transmitting a higher electrical signal through the output when the hydraulic braking pressure within the hydraulic line is raised to a level that is no greater than the normal level as the driver applies a normal pressure to the brake pedal; and a brake light control circuit including:

a braking mode driver transistor having an emitter terminal, a grounded collector terminal, and a base terminal;

a braking flasher driver transistor having an emitter terminal, a grounded collector terminal, and a base terminal;

a mode control comparator having a positive input terminal, a negative input terminal, and an output terminal coupled to the base terminal of the braking mode driver transistor;

a flasher control comparator having a positive input terminal, a negative input terminal, and an output terminal coupled to the base terminal of the braking flasher driver transistor;

a single pole double throw mode electrical relay having a coil with a positive terminal that is coupleable to the brake pedal switch of the braking indication system and a negative terminal coupled to the emitter terminal of the braking mode driver transistor, a normally opened switching contact that is coupleable to the brake pedal switch of the braking indication system, and a normally closed switching contact that is coupleable to the brake pedal switch of the braking indication system and the set of brake lights;

a double pole double throw flasher electrical relay having a coil with a positive terminal coupled to the normally opened switching contacts of the mode electrical relay and a negative terminal coupled to the emitter terminal of the braking flasher drive transistor, a first normally opened switching contact coupled in parallel with the normally closed switching contact of the mode electrical relay, a second normally opened switching contact, and a normally closed switching contact, the flasher electrical relay having an off mode of operation with its normally opened contacts remaining opened and its normally closed contacts remaining closed to thereby prevent energization of the set of brake lights, the flasher electrical relay further having an on mode of operation with its normally closed contacts being opened and its normally opened contacts being closed to thereby deenergize the brake lights, the mode electrical relay having a normal braking mode of operation with its normally closed contacts remaining closed and its normally opened contacts remaining opened to thereby energize the set of brake lights in a constant manner and further deenergize the flasher electrical relay, the mode electrical relay further having a hard braking mode of operation with its normally closed contacts being opened and its normally opened contacts being closed to thereby deenergize the set of brake lights and energize the flasher electrical relay;

a first discharge resistor and a second discharge resistor with the first discharge resistor coupled between the normally opened contacts of the mode electrical relay and the second discharge resistor coupled to ground and the normally closed switching contact of the flasher electrical relay;

adjustable first voltage divider means coupleable to the brake pedal switch of the braking indication system and further coupled to ground and the negative input of the mode control comparator for providing a first fixed electrical reference signal thereto;

a second voltage divider means coupleable to the brake pedal switch of the braking indication system and further coupled to the pressure transducer and the positive input terminal of the mode control comparator for providing an electrical actuating input signal to the mode control comparator that is based on receipt of one of the electrical signals from the pressure transducer, the mode electrical relay being placed in a normal braking mode by the mode control comparator and braking mode driver transistor when the input signal provided by the second voltage divider means is greater than the first fixed reference signal being provided by the first voltage divider means, the mode electrical relay further being placed in a hard braking mode by the mode control comparator and braking mode driver transistor when the input signal provided by the second voltage divider means is less than the first fixed reference signal being provided by the first voltage divider means;

third voltage divider means coupleable to the brake pedal switch of the braking indication system and further coupled to ground and the positive input of the flasher control comparator for providing a second fixed reference signal thereto;

a timing capacitor coupled to ground, the normally closed contacts of the flasher relay, and the negative input terminal of the flasher control comparator for providing an input signal thereto when charged to a given level, the flasher electrical relay being placed in the off mode of operation when the input signal provided by the timing capacitor via the flasher control comparator is less the second fixed reference signal provided by the third voltage divider means, the flasher electrical relay further being placed in the on mode of operation when the input signal provided by the timing capacitor exceeds the second fixed reference signal generated by the third voltage divider means, thereby creating a discharge circuit for the timing capacitor through the second discharge resistor;

a first timing circuit formed of a capacitor and a resistor coupled in parallel with each other and with the coil of the flasher electrical relay to allow for a temporal delay to be realized to thereby permit the set of brake lights of the vehicle to be flashed on and off at a specific rate; and a second timing circuit formed of a capacitor and a resistor coupled in parallel with each other and with the coil of the mode electrical relay to allow for a minimum time that the mode electrical relay remains in the hard braking mode.

* * * * *